United States Patent
Rohrbach et al.

[11] Patent Number: 6,047,436
[45] Date of Patent: Apr. 11, 2000

[54] AUTOMOTIVE WINDSHIELD WIPER BLADE WITH SERVICE LIFE INDICATOR

[75] Inventors: Ronald P. Rohrbach, Flemington; Daniel E. Bause, Morristown, both of N.J.; Dave Buttery, Coventry, R.I.; Gordon W. Jones, Toledo, Ohio; Peter D. Unger, Convent Station; Russell A. Dondero, N. Arlington, both of N.J.

[73] Assignee: AlliedSignal Inc., Morristown, N.J.

[21] Appl. No.: 08/967,396

[22] Filed: Nov. 11, 1997

[51] Int. Cl.[7] ........................................ B60S 1/04
[52] U.S. Cl. ................. 15/250.361; 15/250.48; 15/250.001; 15/250.44; 15/250.351
[58] Field of Search ................. 15/250.361, 245, 15/250.44, 250.48, 250.001, 250.351; 436/135; 422/55, 56, 58–60, 86, 87

[56] References Cited

U.S. PATENT DOCUMENTS

| | | | |
|---|---|---|---|
| 4,243,631 | 1/1981 | Ryerson | 422/90 |
| 4,772,560 | 9/1988 | Attar | 436/165 |
| 4,849,178 | 7/1989 | Azuma | 436/135 |
| 4,859,607 | 8/1989 | Lambert et al. | 426/135 |
| 5,349,718 | 9/1994 | Gibbon . | |

FOREIGN PATENT DOCUMENTS

WO 92/22806  12/1992  WIPO .

OTHER PUBLICATIONS

Leichnitz, "Detector Tube Handbook", 4th Edition, p. 126, Aug. 1979.

Primary Examiner—Gary K. Graham
Assistant Examiner—Andrew Aldag

[57] ABSTRACT

An improved windshield wiper system having a cumulative ozone indicator (20) disposed in proximity to a wiper blade (10) which gives a visual cue when the wiper blade (10) should be replaced. The exposure to a predetermined amount of ozone causes the indicator (20) to change its color and thus communicate to the vehicle operator that it is time to change wiper blade (10). Rather than changing color the indicator (20) can be a pop up device which can be observed by the vehicle operator. To allow a reaction with ozone but to prevent damage from contact with a liquid the indicator (20) is covered with a gas permeable and liquid impermeable material.

10 Claims, 1 Drawing Sheet

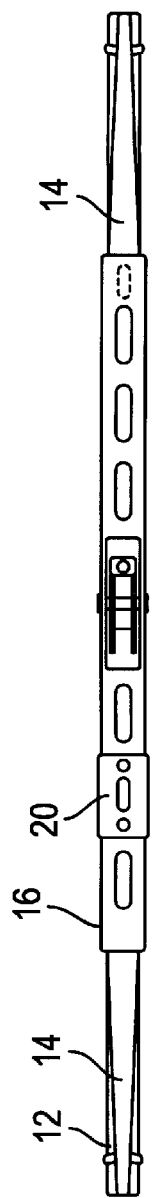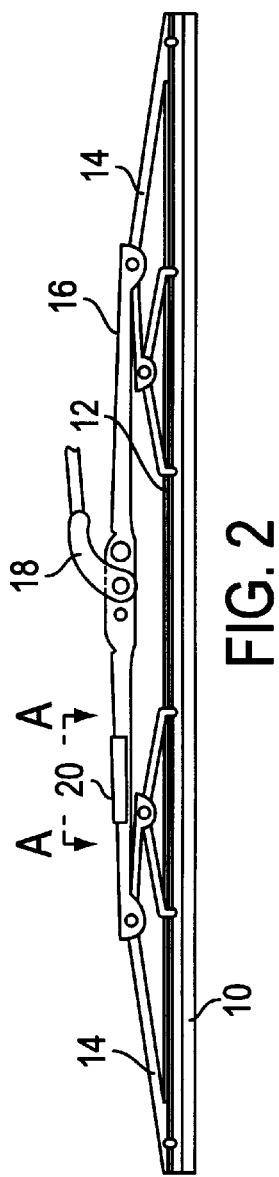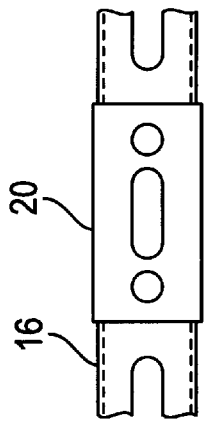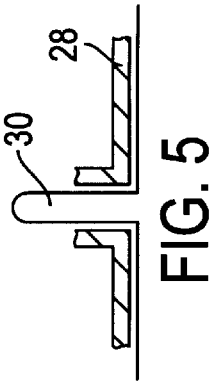

6,047,436

AUTOMOTIVE WINDSHIELD WIPER BLADE WITH SERVICE LIFE INDICATOR

BACKGROUND OF THE INVENTION

1. Field of the Invention

This invention relates to windshield wipers and more particularly to a windshield wiper system including a service life indicator for showing when the wiper blades should be replaced.

2. Description of Prior Art

Automotive users and installers find it difficult to know when it is time to change wiper blades. Normally the user does not notice the gradual reduction in wipe quality. Unless it is raining the user has no way of knowing that the wiper blades may not perform properly next time they are used.

Ozone in the atmosphere is one of the major contributors leading to the failure of a wiper blade. Prolonged exposure to ozone will degrade most rubber compounds. This causes chatter as the blade does not flip from side to side during the wipe. It also weakens the rubber resulting in attrition of the rubber and cracks occurring on the wiping edge. These cracks leave streaks on the windshield when it rains.

Because of the ozone affect most manufacturers recommend that the wiper blades are replaced every six months. However since the amount of ozone exposure varies geographically, the wiper blade real service life varies. The wiper blade life can be as low as 3 months in areas of high ozone concentration to as much as 2 years in other areas.

Since the deterioration of the wiper blades is a gradual process, user will often continue to use the wiper blades long past their useful life. When the wiper blades are used beyond their useful life the vehicle operators vision may be obscured. Therefore, it is desirable to provide a compact, economical indicator for showing the vehicle operator when the windshield wiper blades should be replaced.

U.S. Pat. No. 5,349,718 discloses a wiper blade having an indicator painted on the wiper blade which changes color after being exposed to UV light for a period of time. The indicator paint is a silicone resin paint and would be applied to a wiper blade made of a resilient elastomeric material which is degraded with exposure to UV light in the atmosphere.

SUMMARY OF THE INVENTION

This invention provides, through a cumulative ozone sensing device, an indication that the windshield wiper blades are at their useful life and should be replaced. It has been determined that exposure to ozone causes natural rubber to degrade and crack impacting the quality of the wipe. The ozone sensing device measures the amount of ozone that the blade has been exposed to over a time period. When a certain level of exposure has been reached the ozone sensing device will give a visual indication that the wipers should be checked and a recommendation can be made to change the blades. The ozone sensing device can work on any natural rubber product that requires it keeps its original physical properties.

This device will measure the cumulative amount of ozone that the blade has been exposed to. When a certain exposure level has been reached the device will give a visual indication that the blade should be inspected and that the recommended service life has been reached. The device uses chemical reactors that change color after the exposure level has been reached. Defusers and reagent composition correlates the ozone exposure over time to match the particular rubber compound being used. The device will be attached to the wiper assembly usually on the frame.

The disclosed ozone sensor devices are not intended to be fool proof but to provide and an indication, that will act as an alert even during dry periods that the blade performance should be checked. A device according to the present invention provides a clear visual indication when windshield wiper blades should be checked for replacement.

BRIEF DESCRIPTION OF DRAWINGS

For a better understanding of the invention reference may be had to the preferred embodiments exemplary of the inventions shown in the accompanying drawings in which:

FIG. 1 is a top view of a windshield wiper having an ozone sensor device according to the present invention;

FIG. 2 is a side view of the windshield wiper having an ozone sensor device according to the present invention;

FIG. 3 is an enlarged top view, taken along the lines A—A, of a portion of the windshield wiper shown in FIG. 2, showing the cumulative ozone sensing wiper blade condition indicator;

FIG. 4 is a side view of another embodiment of the invention showing a pop up cumulative ozone indicator; and, FIG. 5 is a view similar to FIG. 4 showing the pop up cumulative ozone indicator in the upright position.

DETAILED DESCRIPTION OF THE PREFERRED EMBODIMENTS

Referring now to the drawings and FIGS. 1, 2 and 3 in particular there is shown a windshield wiping system utilizing according top the present invention an ozone sensing device 20 which provides a visual cue that the windshield wiper blades 10 have past their useful life. The windshield wiper as shown in FIG. 1 is used for wiping moisture from the surface of the windshield of a motor vehicle. The windshield wiper has a wiper blade 10 formed of organic rubber, silicone rubber or other resilient elastomeric material. A backing plate 12 is attached to the back of the wiper blade 10. Two holding members 14 engage backing plate 12 at two separate positions near opposite ends of the wiper blade 10. A larger holding member 16 pivotally engages each of the holding members 14 at a central position. A wiper arm 18 which is driven by an electric motor connects to the center of holding member 16.

There are several embodiments, which are described below, for a cumulative ozone sensor 20 which can be mounted on the windshield wiper arm/blade or holding pin. This sensor 20 will alert the driver with a visual cue when the wiper blade 10 needs replacement resulting from its exposure to the deteriorating affects of ozone.

A number of ozone sensors 20 assembly embodiments are described below and each is identified based on its mechanism of action. Basically this invention utilizes a cumulative ozone sensor 20 rather than a commercially available ozone level sensor badge. The commercially available ozone level sensor badges are exposure level ozone indicators. These badges are designed to last up to 1 to 2 hr and will record if you have experienced any ozone excursions above a certain level during this time. The badges are not cumulative sensors and would not be adequate for a 6 month to a two year cumulative ozone sensor. Nevertheless some of the chemistry involved in the badge sensor technology might be used to create a cumulative ozone sensor.

All of the embodiments described below can be made on a porous/fibrous material and covered with a gas permeable and liquid impermeable membranous material such as Gortex, microporous polyethylene, Tyvec, Aclar, shrinkwrap or the like. The gas permeable membrane material permits the ozone gas to react with the sensor material while protecting the sensor material from contact with liquids. The ozone sensor module 20 can be made small enough so that it can be mounted on either the wiper blade arm or side pin.

Color Change Titration Embodiment: In this embodiment a classical colored ozone colorimetric reagent is used as the primary ozone detection vehicle, i.e. indigo when in the presence of ozone is converted from the blue form to a yellow or white product. A secondary reagent is also employed which has a higher affinity for the ozone than the colored reagent, such as KI. In this case the secondary reagent will be consumed until it is exhausted after which any ozone reaction will be with the indigo dye. One can load sufficient secondary reagent according to how long one wants to retard the indigo dye reaction. Thereby creating a delay in the indigo color dye change which is tailored to meet the time frame and cumulative ozone exposure involved. In use one will have to correlate ozone degradation of the wiper blade 10 to ozone levels so as to tune this sensor to the required degradation/ozone/time profile.

Color Change Additives Depletion Embodiment: In this embodiment one measures the disappearance of additives which protects the rubber wiper blade 10 from damage from whatever the cause. Several mechanisms of degradation occurs with rubber mostly of a free radical nature. Consequently, additives such as photostabilizers, antioxidants, and antiozonants are incorporated into the rubber. Upon molding the rubber these additives are designed to bloom to the surface where their affect is most required. The economy and mobility of these additives could also lead one to design a sensor based on their presence and migrating ability. Most of these additives are highly colored and when they have been depleted there will be a significant change in color. Since wipers are heavily pigments with carbon black this change in color can't be seen. In this embodiment we incorporate some of these additives in a composite of rubber with some white pigment, i.e., titanium dioxide (for color contrast) and adhere this patch in proximity to the wiper blade 10. As the additives degrade the color will change until a point is reached when the additives have been by the degrading elements.

Pop-up Indicator Embodiment: In this embodiment, as shown in FIGS. 4 and 5, a very thin membrane layer 28 of rubber is cast over a depressed molding finger 30, which is similar those little pencil lead shaped molding extrudates found on new tires, keeping it in a generally flat depressed orientation. The membrane material 28 is of the same composition as the wiper blade 10 and is cast in a stress configuration along with the stress of the molding finger 30 trying to right itself. As the ozone degrades and cracks the wiper blade 10 it will also deteriorate the membrane 28. When sufficient degradation occurs the molding fiber 30 would break through the membrane 28 and pop-up, as shown in FIG. 5, indicating the need to change the wiper blades 10. This approach measures the direct degradation of the rubber wiper blade 10.

The above embodiments can be used to alert the driver when his wiper blades 10 are in need of replacement. Ozone degradation of the rubber is one of the leading causes of deterioration in the physical properties of the rubber which leads to cracking and physical loss from attrition. This results in the common experience of windshield wiper streaking.

We claim:

1. A windshield wiper system comprising:
    an elongated wiper blade of elastomeric material for use in an environment having ozone and said elongated wiper blade having a finite useful life;
    a marker mounted on said elongated wiper blade and including a pigment which is sensitive to ozone; and
    said marker changing color after exposure to a predetermined amount of ozone such that said marker gives a visual cue that said elongated wiper blade needs to be replaced.

2. A windshield wiper system as claimed in claim 1 wherein a gas permeable and liquid impermeable membranous material covers said marker.

3. A windshield wiper system comprising:
    an elongated wiper blade of elastomeric material for use in an environment having ozone and said elongated wiper blade having a finite useful life;
    a holding member for engaging and supporting said elongated wiper blade;
    a marker mounted either on said holding member or on said elongated wiper blade and including a pigment which is sensitive to ozone; and
    said marker changing color after exposure to a predetermined amount of ozone such that said marker gives a visual cue that said elongated wiper blade needs to be replaced.

4. A windshield wiper system as claimed in claim 3 wherein said marker comprises:
    a colored ozone colormetric reagent which in the presence of ozone is converted from a fist color to a second color; and,
    a secondary reagent which has a higher affinity for the ozone than said colored ozone colorimetric reagent so that the secondary reagent is consumed until it is substantially exhausted after which the ozone will react with said colored ozone colorimetric reagent causing it to change to the second color.

5. A windshield wiper system according to claim 3 wherein the marker is mounted on the elongated wiper blade.

6. A windshield wiper according to claim 3 wherein the marker is mounted on the holding member.

7. A windshield wiper according to claim 3 wherein a gas permeable and liquid impermeable membranous material covers said marker.

8. A windshield wiper system for use in an environment having ozone comprising:
    an elongated wiper blade formed of an elastomeric material and having a finite useful life;
    holding members engaging and supporting said elongated wiper blade;
    a wiper arm which is driven by an electric motor connected to said members;
    a cumulative ozone sensor mounted on said elongated wiper blade, on said holding members, or on said wiper arm;
    said sensor comprising a porous or fibrous material,
    a gas permeable and liquid impermeable membrane material covering said porous or fibrous material, and
    a visual cue mounted on said porous or fibrous material for providing a visual indication when the cumulative ozone sensor has been exposed over a period of time to a selected amount of ozone.

9. A windshield wiper system as claimed in claim 8 for use in an environment having ozone wherein said visual cue comprises a marker mounted on said porous or fibrous material and includes a pigment which is sensitive to ozone; and, said marker changes color after exposure to a predetermined amount of ozone such that said marker gives a visual indication that said elongated wiper blade needs to be replaced.

10. A windshield wiper system as claimed in claim 9 wherein said cumulative ozone sensor is mounted on said holding members.

* * * * *